United States Patent Office 3,214,337
Patented Oct. 26, 1965

3,214,337
METHODS OF TREATING ARTERITIS AND
DELAYED CICATRIZATION
Paul Louis Couturier, 20 Rue St. Leon, Toulouse, France
No Drawing. Filed Jan. 29, 1963, Ser. No. 254,613
Claims priority, application Switzerland, Apr. 26, 1960,
4,728/60
4 Claims. (Cl. 167—55)

The present invention relates to a method for the treatment of human patients suffering from arteritis, and human patients suffering from delayed dermal cicatrization such as sluggishly healing wounds, ulcers of the leg, eschars, uncicatrized skin grafts, and burns.

The present application is a continuation-in-part of my application Serial No. 73,180 filed December 2, 1960, now abandoned.

In the past, according to the general principle set forth by Einhorn that aromatic acid esters exhibit a local anesthetic activity, a number of authors and, inter alia, F. Blicke and E. I. Jenner, Ming Chien Chiang and W. H. Hartung carried out tests with the dialkylaminoalkyl esters of pyridine carboxylic acids, but such esters were found to be very poorly active or to be lacking in anesthetic activity. The investigations of these authors related solely to the anesthetic activity of the esters, while the other physiological properties thereof were not investigated.

It should be emphasized that the dialkylaminoalkyl esters of pyridine-3-carboxylic acid in base form or as hydrochloric acid salts are very hygroscopic and poorly stable.

The stable 3-(diethylamino-ethoxy-carbonyl)-pyridine citrate according to the invention and 3-(dimethylamino-ethoxycarbonyl)-pyridine citrate exhibits several advantageous properties such as being a stable product of excellent tolerance and of reduced toxicity with respect to the other esters of pyridine-3-carboxylic acid; there is evidence of less deleterious side effects such as respiratory depression, gastric irritation of vasomotor reactions than with pyridine-3-carboxylic acid.

The stable salt of invention can be prepared by heating quinoleic anhydride in presence of an inert solvent with diethylaminoethanol, decarboxyling the monoester of the quinoleic acid obtained by heating it at high temperature and isolating the ester of the 3-pyridinecarboxylic acid by known methods.

The following example illustrates the preparation of 3-(diethylamino-ethoxy-carbonyl) pyridine and its citrate.

*Example 1*

149 g. of quinoleic anhydride are dissolved in 300 ml. of toluene; one adds to said solution 117 g. of diethylaminoethanol and the solution is brought to reflux during at least two hours. After cooling, one filters the monoquinoleate of diethylaminoethanol which has formed; one washes and dries it. 266 g. of monoquinoleate of diethylaminoethanol thus prepared are put into a Claisen balloon modified Vigreux, heated in a vacuum of 3 mm. (the output of the vacuum pump must be sufficient for compensating the pressure increase in the apparatus, increase due to the carbonic gas release). The balloon is heated in a bath up to a temperature of 160–180° C., inside temperature of the balloon 120–130° C.

One obtains thus the diethyl-aminoethylester of 3-pyridine-carboxylic acid, the physicochemical properties of which are as follows:

Boiling point by 3 mm. _____° C__ 131
$n_D^{20°}$ _____ 1.5001
$d^{20°}$ _____ 1.04132

210 grams of hydrated pure citric acid from the pharmacopoeia are dissolved in 500 ml. of methanol. This operation is carried out in a water-bath. After solution and partial cooling 230 grams of 3-(diethyl-amino-ethoxycarbonyl)-pyridine are added; after formation of the ester salt, there are added 500 ml. of ethyl acetate. The solution becomes turbid and the citrate of 3-(diethyl-ammonio-ethoxycarbonyl)-pyridine is precipitated. After twelve hours of rest, one filters and washes thoroughly the precipitate with 500 ml. of ethyl acetate and dries it at a low temperature (20 to 50° C.) The ester salt appears as a microcrystalline non hygroscopic white powder having a slight aromatic odour and a taste both acid and bitter. This ester salt is very soluble in water, even cold, insoluble in cold absolute alcohol, cold acetone and benzene. It is soluble under heat in ethyl alcohol and hydrated acetone. Its melting point is 123° C. The aqueous solution is inactive on polarized light. The molecular weight of the ester salt amounts to 414.4.

When administered by oral or parenteral route, this product is excreted more slowly (because of its long-acting effect) and the metabolites thereof are retained in the organism for a longer period of time than those of pyridine-3-carboxylic acid, thus making possible the administration of relatively small doses with satisfactory therapeutic effects.

The product according to the invention exhibits very low toxicity. The following is an illustrative example of the toxicity of 3-(diethylamino-ethoxy-carbonyl)-pyridine citrate: Dosages of 2,000 mg./kg. in rat, guinea pig and rabbit show no anatomic or histologic pathologic modification. Dosages of 250 mg./kg., on intramuscular administration, are well tolerated in rat and rabbit. Dosages of 50 to 100 mg., on intravenous administration, are adequately tolerated in dog.

The stable salt according to the invention may be administered according to the conventional methods as pharmaceutical preparations for the treatment of trophic disorders and in arteritis (technique of Nolf).

When the product is used by the oral route, in the form of capsules or sugar-coated tablets for example, they may contain such excipients as lactose and starch. When administered by intramuscular or intra-arterial injection the product is dissolved in a phosphate buffer to produce an injectable solution having a pH value within the range 6 to 6.5. When the materials are to be administered by intra-arterial perfusion, they must be diluted with 50 to 100 ml. of saline isotonic solution.

The above derivative may be administered in Man at daily doses which may vary within very wide limits such as from 25 to 600 mg. The upper dosage is limited by the desired therapeutic effect. On parenteral administration, dosages of 25 to 100 mg. are preferably used. For such administrations, the instant composition is prepared in unit dosage form advantageously containing from 25 to 100 mg. of active principle in any of the above-mentioned vehicles.

The practice of this invention is further illustrated by means of the following examples which are not intended to be limitations on the scope of the invention. The physician will determine the most suitable dosage and route of administration.

*Example 2*

A suitable sugar-coated pill unit dose contains:

|  | Mg. |
|---|---|
| 3-(diethyl-amino-ethoxy-carbonyl)-pyridine citrate | 50 |
| Lactose | 50 |
| Kaolin | 30 |
| Gum arabic | 3 |
| Talc | 5 |
| Starch | 5 |
| Magnesium stearate | 1 |
| White sugar, q.s., for a 300 mg. sugar-coated pill. | |

*Example 3*

A suitable vial unit dose contains:

| | Mg. |
|---|---|
| 3-(diethylamino-ethoxy-carbonyl)-pyridine citrate | 50 |
| Citric acid | 2.94 |
| Crystalline disodium phosphate | 173 |
| Distilled water, q.s., to 5 ml. | |

I claim:
1. The method of treating patients suffering from arteritis, comprising administering to such a patient a nontoxic but effective amount of 3-(diethylaminoethoxy-carbonyl)-pyridine citrate in a pharmaceutical carrier.
2. The method of claim 1, wherein said amount is 25–100 mg. daily by parenteral route.
3. The method of claim 1, wherein said amount is 25–600 mg. daily by oral route.
4. The method of treating patients suffering from delayed cicatrization, comprising administering to such a patient a nontoxic but effective amount of 3 (diethylaminoethoxycarbonyl) pyridine citrate in a pharmaceutical carrier.

References Cited by the Examiner

UNITED STATES PATENTS

| 2,194,567 | 3/40 | Renshaw | 260—295 |
| 2,766,252 | 10/56 | Schlesinger | 260—295.5 |
| 2,773,065 | 12/56 | Carrara | 260—295 |
| 2,831,892 | 4/58 | Dornfeld | 167—65—290 |
| 2,834,785 | 5/58 | Biel | 167—65—290 |
| 2,914,533 | 11/59 | Clinton | 260—295.5 |
| 2,994,640 | 8/61 | Zeller | 167—65 |
| 3,144,387 | 8/64 | Jones | 167—65 |

OTHER REFERENCES

Blicke et al., J. Am. Chem. Soc., vol. 64, pages 1721–1723, 1942.

British Medical Journal, No. 5160, Nov. 28, 1959, pages 1163–1164.

British Medical Journal (1), No. 5325, Feb. 2, 1963, page 319.

Chiang et al., J. Org. Chem., vol. 10, pages 26–28, 1945.

Dorland's Illustrated Medical Dictionary, 23rd Edition, W. B. Saunders Co., Philadelphia, 1957, trophic, p. 1471.

Ingersoll et al., J. Am. Chem. Soc., vol. 48, pp. 2449–2452, 1926.

Manufacturing Chemist, vol. 32, No. 8, page 374, August 1961.

Stedman's Medical Dictionary, Twentieth Edition, The Williams and Wilkins Co., Baltimore, 1961, p. 1577, trophic.

JULIAN S. LEVITT, *Primary Exmainer*.

FRANK CACCIAPAGLIA, JR., LEWIS GOTTS,
*Examiners.*